United States Patent

[11] 3,572,695

| [72] | Inventors | Vladislav Janirek<br>Gottwaldov;<br>Zdenek Miculka, Otrokovice,<br>Czechoslovakia |
|---|---|---|
| [21] | Appl. No. | 828,998 |
| [22] | Filed | May 29, 1969 |
| [45] | Patented | Mar. 30, 1971 |
| [73] | Assignee | Strojosvit, narodni podnik<br>Krnov, Czechoslovakia |

[54] CONVEYOR FOR TRANSPORTING AND DEPOSITING FLEXIBLE SHEET MATERIAL
9 Claims, 8 Drawing Figs.

[52] U.S. Cl. .................................................. 271/78, 271/65
[51] Int. Cl. .................................................. B65h 29/36
[50] Field of Search .................................................. 271/67, 77, 66, 73, 78, 65, 68

[56] References Cited
UNITED STATES PATENTS

| 1,187,456 | 6/1916 | Adam | 271/66 |
| 3,281,146 | 10/1966 | Bridge | 271/73X |

*Primary Examiner*—Evon C. Blunk
*Assistant Examiner*—Joseph Wegbreit
*Attorney*—Richard Low ABSTRACT: A conveyor for transporting flexible sheet material and depositing the same at a predetermined location includes an endless conveyor belt and a plurality of rollers around which the belt is guided. At least one of these rollers is driven by a suitable drive means while another of the rollers forms a delivery roller situated at an end of the endless belt where the sheet material which has been transported by the belt leaves the latter to be deposited at the predetermined location. A first shifting structure is operatively connected with the delivery roller for shifting the latter back and forth at a linear speed equal to the linear speed of movement of the conveyor belt itself. The rollers include an even number of length-compensating rollers around which length-compensating loops of the belt are guided to compensate for the extension and contraction of the belt required by the back-and-forth movement of the delivery roller. The length-compensating rollers are also shifted back and forth, but by a second shifting structure which shifts the length-compensating rollers at a speed equal to the quotient of the linear shifting speed of the delivery roller divided by the number of length-compensating rollers.

Patented March 30, 1971

INVENTORS
Vladislav Janírek, Zdeněk
Mičulka
By Richard Low agt

Patented March 30, 1971　　　　　3,572,695
3 Sheets-Sheet 2
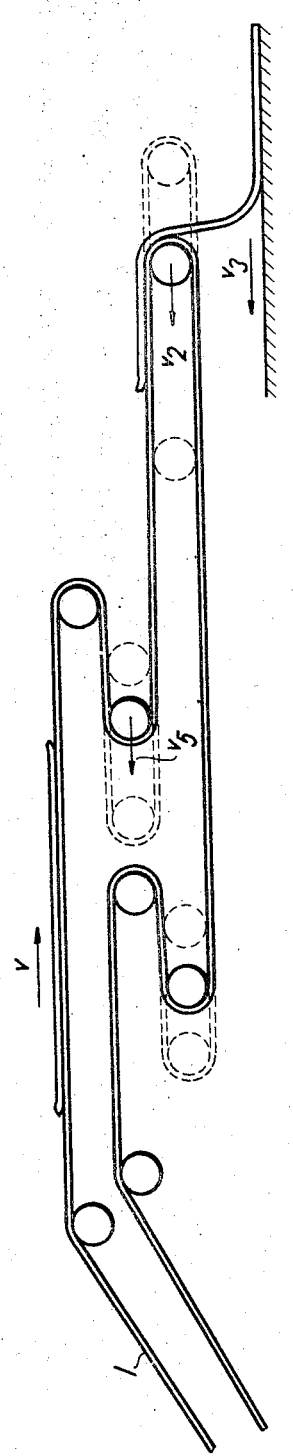
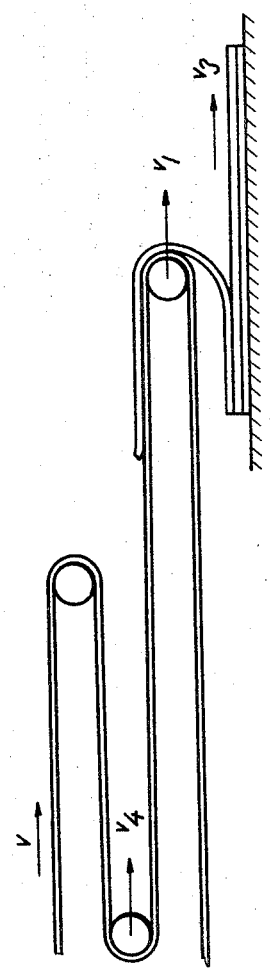
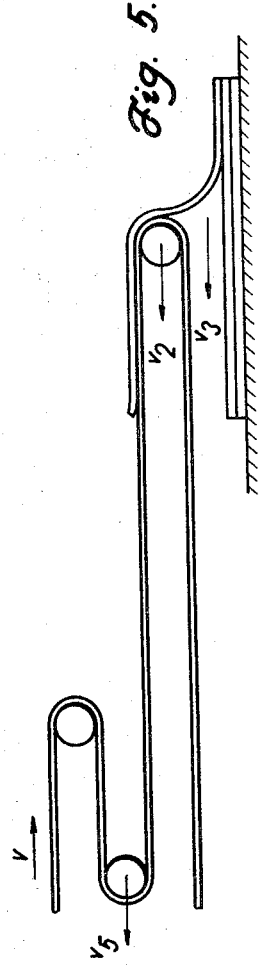
INVENTORS
Vladislav Janírek, Zdeněk Mičulka
By Richard...

Patented March 30, 1971
3,572,695
3 Sheets-Sheet 3
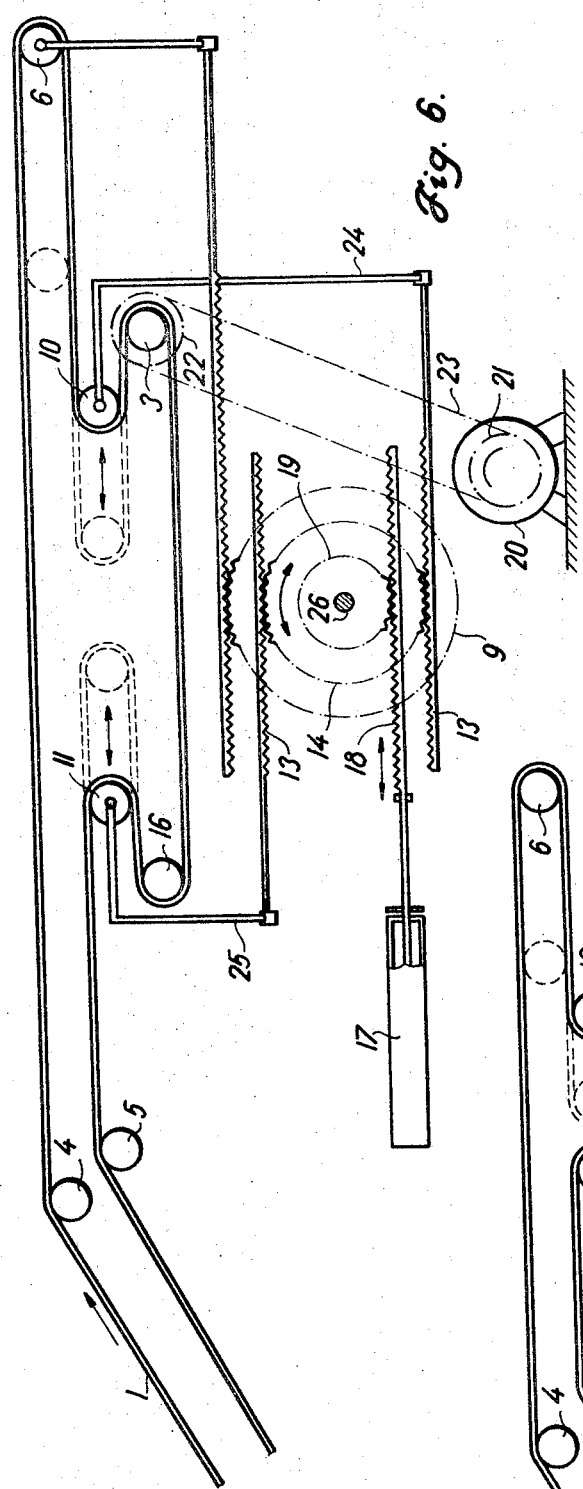
Fig. 6.
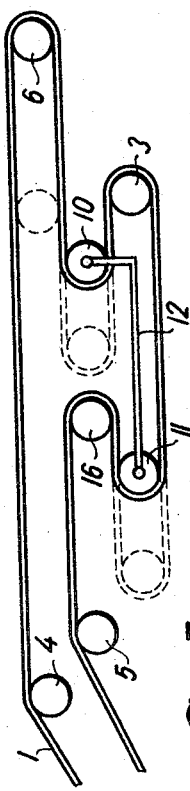
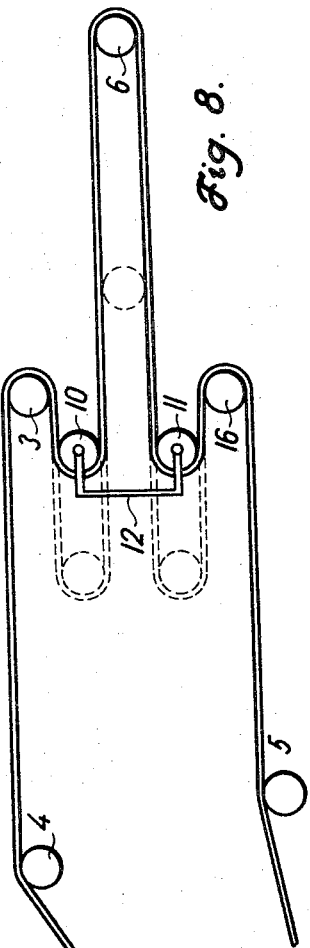
Fig. 7.
Fig. 8.
INVENTORS
Vladislav Janirek
Zdeněk Mičulka
By Richard Low Ag't

CONVEYOR FOR TRANSPORTING AND DEPOSITING FLEXIBLE SHEET MATERIAL

BACKGROUND OF THE INVENTION

The present invention relates to conveyors.

In particular, it relates to conveyors for transporting flexible sheet material and depositing the latter at a predetermined location.

The invention is concerned with a belt-type conveyor capable of transporting and depositing flexible sheet material, such as, for example, leather, with the conveyor taking the form of an endless belt guided around suitable rollers.

Throughput machines through which sheet material passes during the treatment thereof determine the requirements for the flow of the manufactured goods along predetermined paths. Among known machines for depositing flexible sheet material at a given location, there are such structures as systems of swingable conveyors with shiftable double conveyors or with doubled conveyors. With the known structures which utilize belt conveyors for transporting the sheet material, there is the danger of two-sided crossing of cables or belts with the possiblity of carrying the transported material along in an undesired manner. The known structures for conveying and depositing flexible sheet material, which are in the form of an endless conveyor band guided around a system of rollers and including a pair of rollers which are rotatably carried on a shiftable frame are not capable of fulfilling all of the required variations in the transporting and depositing of flexible sheet material with a continuous operation of the conveyor belt.

SUMMARY OF THE INVENTION

It is thus a primary object of the present invention to provide a structure for conveying and depositing flexible sheet material, which will avoid the above referred to drawbacks.

More particularly, it is an object of this invention to provide a construction which will very efficiently deposit a flexible sheet material at a predetermined location without any possibility of wrinkling of the sheet material or pulling and slipping thereof while being transported and deposited at the require location.

Another object of the invention is to provide a construction which utilizes only one endless conveyor belt while having rollers capable of being easily and precisely regulated to bring about the required transportation and deposit of the sheet material.

In accordance with the invention, the endless conveyor belt is guided around a plurality of rollers at least one of which is driven to form a driving roller for moving the endless conveyor belt at a given linear speed. At one end of the endless belt is a delivery roller with which a shifting means coacts to shift the delivery roller back and forth at a speed equal to the linear speed of the belt to bring about delivery of the sheet material from the conveyor belt to the predetermined location where the sheet material is to be deposited. The rollers which guide the endless conveyor belt include not only the delivery roller but also an even number of length-compensating rollers which provide for the endless belt the length compensation required during the back-and-forth shifting of the delivery roller. A second shifting means coacts with the length-compensating rollers for shifting the latter back and forth in a predetermined synchronism cyclically with respect to the back-and-forth shifting of the delivery roller so as to bring about the extension and contraction of the belt required by the back-and-forth movement of the delivery roller. The second shifting means moves the length-compensating rollers at a speed equal to the quotient of the linear shifting speed of the delivery roller divided by the number of length-compensating rollers.

BRIEF DESCRIPTION OF DRAWINGS

The invention is illustrated by way of example in the accompanying drawings which form part of this application and in which:

FIGS. 2 to 5 illustrate various operations which can be carried out with the structure of the invention; and FIGS. 6 to 8 schematically illustrate other possible embodiments of the device of the invention.

DESCRIPTION OF PREFERRED EMBODIMENTS

Figure 1:
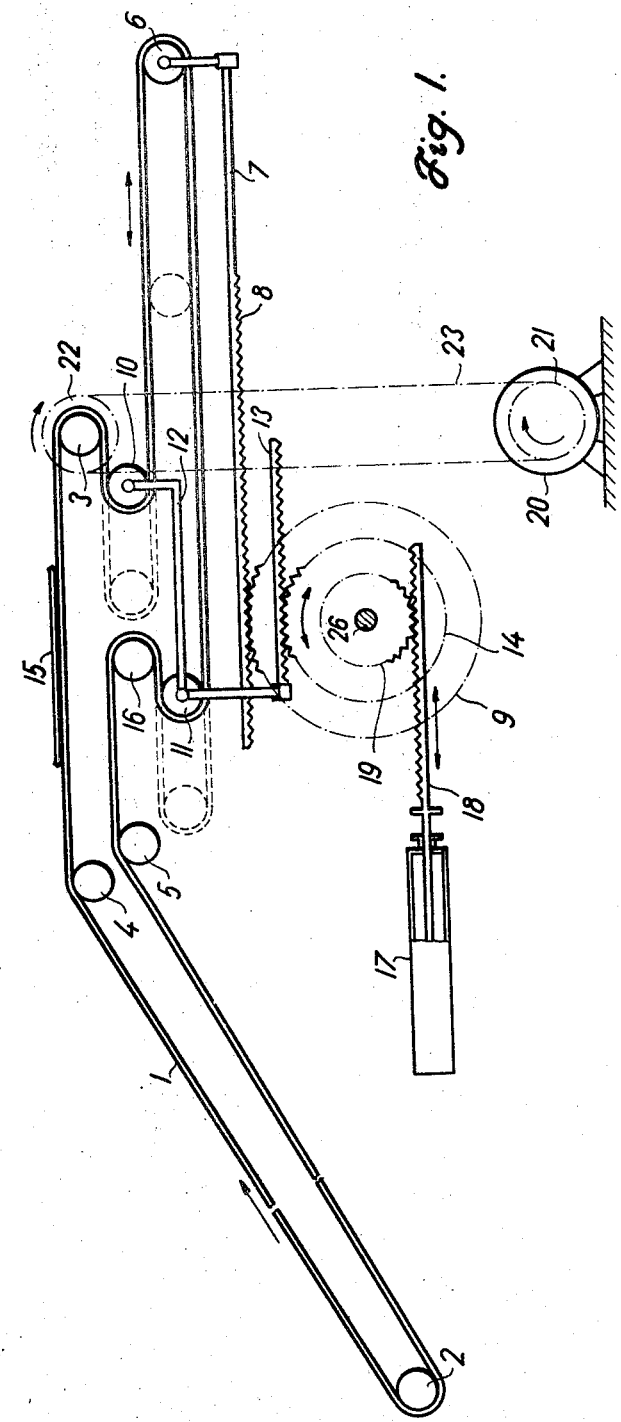
FIG. 1 is a schematic side elevation of an embodiment of the device of the invention.

Referring to the drawings in greater detail now, and initially to FIG. 1, it will be seen that the device of the invention includes an endless conveyor belt 1 which transports sheet material, such as a leather sheet 15, to a predetermined location where the sheet material is deposited in a predetermined manner. The endless conveyor belt 1 is guided around a plurality of rollers which include rollers 2 and 3 around which the topmost run of the belt is guided in the manner indicated in FIG. 1. It will be noted that the topmost run of the belt 1 moves from left to right.

The roller 3 is driven by a drive means which includes a sprocket 22 coaxially fixed to the roller 3 for rotating the latter, and driven by an endless chain 23 which is in turn driven by a driving sprocket 21 driven by the motor 20. It will be noted that according to FIG. 1 the sprockets 21 and 22 as well as the driven roller 3 all rotate in a clockwise direction. The drive is such that the endless belt 1 will have a predetermined linear speed.

The topmost run of the belt 1 is supported intermediate its ends by a roller 4, while the next lower run which moves downwardly in opposite direction toward the roller 2 is supported by an intermediate freely rotatable roller 5.

At its right end, as viewed in FIG. 1, the belt 1 is guided around a delivery roller 6 which is located at the delivery end of the belt where the transported sheet material 15 leaves the belt and is deposited at the required location. The delivery roller 6 is shifted back and forth in a horizontal direction, as indicated by the double-headed arrow in FIG. 1, and for this purpose the delivery roller 6 is carried by a frame means 7 which supports the delivery roller 6 for free rotary movement and which is itself shifted back and forth by a shifting means. This shifting means includes in the illustrated embodiment a rack 8 which meshes with a pinion 9 carried by a rotary shaft 26 which in turn fixedly carries a pinion 19 meshing with a rack 18 reciprocated back and forth by a suitable fluid drive 17, also shown in FIG. 1, so that the angular oscillation of the components 19, 26, and 9 will result in back-and-forth movement of delivery roller 60. The shifting means which shifts the delivery roller back-and-forth has its drive precisely regulated to provide for the back-and-forth movement of the delivery roller 6 a speed equal to the linear speed of the belt 1.

The components which form one of the most important parts of the structure of the invention are length-compensating rollers which operate cyclically to compensate for the contraction and extension of the belt 1 required by the back-and-forth movement of the delivery roller 6. In accordance with the invention there must be an even number of length-compensating rollers, and a second shifting means coacts therewith to shift these length-compensating rollers back and forth in synchronism with the movement of the delivery roller 6 at a speed equal to the quotient of the speed of the shifting movement of the delivery roller 6 divided by the number of length-compensating rollers.

In the embodiment illustrated in FIG. 1, there are a pair of length-compensating rollers 10 and 11 both carried by a frame means 12 which supports the roller 11 for free rotary movement while maintaining rollers 10 and 11 at a given unchanging distance and relationship with respect to each other. Thus, the belt 1 after passing around the roller 3 moves in the opposite direction around the length-compensating roller 10 before extending around the delivery roller 6. From the delivery roller 6, the endless belt 1 is guided around the second length-compensating roller 11 and then from the latter around a guide roller 16 which has a stationary axis.

The shifting means which is operatively connected with the length-compensating rollers 10 and 11 includes an but has a diameter greater than that of the driving pinion 19 but rack 13 meshing with a pinion 14 which is also fixed to the shaft 26 but has a diameter greater than that of the driving pinion 9 but smaller than that of the pinion 9. The relationship between the diameters of the pinions 9 and 14 is such that in the embodiment selected for illustration the length-compensating rollers 10 and 11 will be shifted back and forth at a speed equal to one-half the speed of the back-and-forth movement of the delivery roller 6.

Figure 2:
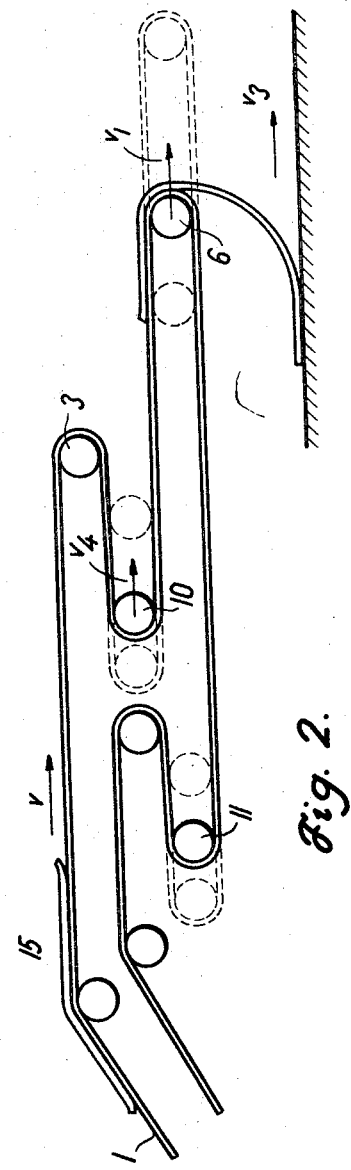

Referring to FIGS. 2 and 3, the linear travel speed $v$ of the belt 1 equals the linear speed $v_1$ of the movement of the roller 6 in one direction as well as the linear speed $v_2$ of the roller 6 in the opposed direction, and all of these speeds which are equal to each other are also equal to the speed $v_3$ with which the sheet material 15 is deposited. On the other hand, the speeds of movement $v_4$ and $v_5$ of the length-compensating rollers 10 and 11 (see FIGS. 4 and 5) are each equal to one-half the speed $v_1 v_2$ or $v_3$.

From FIGS. 2 to 5, it will be seen that with the device of the invention it is possible to deposit the flexible sheet material in three basically different ways. As may be seen from FIG. 2, the sheet material can be deposited with its top surface directed downwardly. As shown in FIG. 3, it is also possible to deposit the sheet material with its top surface directed upwardly. Further, as is shown in FIGS. 4 and 5, it is possible to deposit one sheet with its top side directed upwardly, the next sheet with its top side directed downwardly, and so one, so that, as is indicated in FIGS. 4 and 5, the successive sheets of the stack are arranged front-to-front and back-to-back with each sheet having its front face engaging the front face of an adjoining sheet and its back face engaging the back face of the other adjoining sheet.

To take care of possible contraction and elongation of the belt 1 resulting from temperature changes, it is preferred to use an arrangement as shown either in FIG. 1 or in FIG. 8, according to which that run of the belt which, respectively, moves to and from the delivery roller 6 is provided with the intermediate loop that extends around the length-compensating roller 10 and 11, respectively. It will be noted in connection with FIG. 8 that the pair of length-compensating rollers 10 and 11 are located one above the other at elevations higher and lower than the delivery roller 6, the frame 12 of this embodiment having the configurations schematically illustrated in FIG. 8. However, it is also possible to provide an arrangement as shown in FIG. 7 where the delivery roller 6 is located in advance of the pair of length-compensating rollers. In the case of the latter arrangement, the belt will form an intermediate loop extending around the length-compensating roller 10 and situated between the rollers 6 and 3, while the intermediate loop which extends around the roller 11 is situated between the rollers 3 and 16. For this purpose, the frame means 12 has a configuration as schematically shown in FIG. 7.

While with all of the above described embodiments the frame means 12 which carries the length-compensating rollers maintains them at a predetermined relationship with respect to each other at all times, it is also possible to provide length-compensating rollers which simultaneously move in opposite directions toward and away from each other. Such an arrangement is illustrated in FIG. 6 where the pair of length-compensating rollers 10 and 11 are carried by a frame 24 and 25, respectively, each frame being connected with a rack 13 which simultaneously mesh with diametrically opposed teeth of pinion 14. In this way, during reciprocation of the pinion 14 the length-compensating rollers 10 and 11 will simultaneously move toward and away from each other.

It will be seen that with all of the embodiments, the length-compensating rollers are moved in such a way as to automatically compensate for the extension and contraction of the belt required by the back-and-forth movement of the delivery roller 6. This compensation is brought about by increasing and decreasing the length of the intermediate loops with extend around the length-compensating rollers 10 and 11, respectively.

In the event that a particular installation requires relatively short paths of movement for the length-compensating rollers, then the number thereof may simply be increased, the only requirement being that the device include an even number of length-compensating rollers. In all cases the speed of shifting movement of the latter rollers will be equal to the speed of shifting movement of the delivery roller divided by the number of length-compensating rollers.

It is possible with the structure of the invention to deposit sheet material directly on a floor in a suitable stack, or the material may, if desired be deposited on a platform, tannery stand or the like for further handling.

The structure of the invention provides great advantages with respect to the safety and reliability with which the device operates during continuous movement of the conveyor belt.

We claim:

1. In a device for transporting a flexible sheet material and depositing the latter at a predetermined location, an endless conveyor belt, a plurality of rollers, around and along which said belt is guided, drive means operatively connected to one of said rollers for rotating the latter to drive said belt with a predetermined linear speed, said rollers including a delivery roller situated at a delivery end of the belt where the transported sheet material is deposited from said belt at said predetermined location, first shifting means operatively connected with said delivery roller for shifting the latter back and forth at a speed equal to said linear speed of the belt, and an even number of length-compensating rollers around which intermediate loops of said belt are guided while said length-compensating rollers move cyclically in a predetermined synchronism with the back-and-forth movement of said delivery roller to provide for the belt extension and contraction required by the back-and-forth movement of the delivery roller, and second shifting means operatively connected with said even number of length-compensating rollers for shifting the latter at a linear speed equal to the shifting speed of said delivery roller divided by the number of said length-compensating rollers.

2. The combination of claim 1 and wherein there are only one pair of length-compensating rollers shifted by said second shifting means at a speed which is one-half the speed of movement of said delivery roller.

3. The combination of claim 1 and wherein a first frame means carries said delivery roller and a second frame means carries said length-compensating rollers, said first and second shifting means respectively including a first rack and pinion drive operatively connected with said first frame means and a second rack and pinion drive operatively connected with said second frame means.

4. The combination of claim 1 and wherein a frame means supports said length-compensating rollers and maintains them at given, unchanging distances from each other while said second shifting means acts on said frame means to shift said length-compensating rollers.

5. The combination of claim 1 and wherein a pair of frame means are respectively operatively connected with and each carry one-half the number of length-compensating rollers, and said second shifting means being operatively connected with said pair of frame means for simultaneously reciprocating the latter in opposed directions toward each other and away from each other to move one-half the number of length-compensating rollers in one direction and the other half of the number of length-compensating rollers simultaneously in an opposed direction.

6. The combination of claim 5 and wherein there are only one pair of length-compensating rollers respectively carried by said pair of frame means, and said shifting means including an oscillating pinion and a pair of racks respectively meshing with diametrically opposed peripheral regions of said pinion and respectively connected with said pair of frame means.

7. The combination of claim 2 and wherein one of said length-compensating rollers is at an elevation higher than said delivery roller while the other of said length-compensating rollers is at the same elevation as said delivery roller.

8. The combination of claim 2 and wherein said delivery roller is at an elevation higher than both of said length-compensating rollers.

9. The combination of claim 2 and wherein said length-compensating rollers are located one directly over the other respectively at elevations higher and lower than said delivery roller.